Nov. 7, 1933.  C. S. ASH  1,933,956
METHOD OF MANUFACTURING SPOKED WHEELS
Original Filed July 9, 1922    2 Sheets-Sheet 1
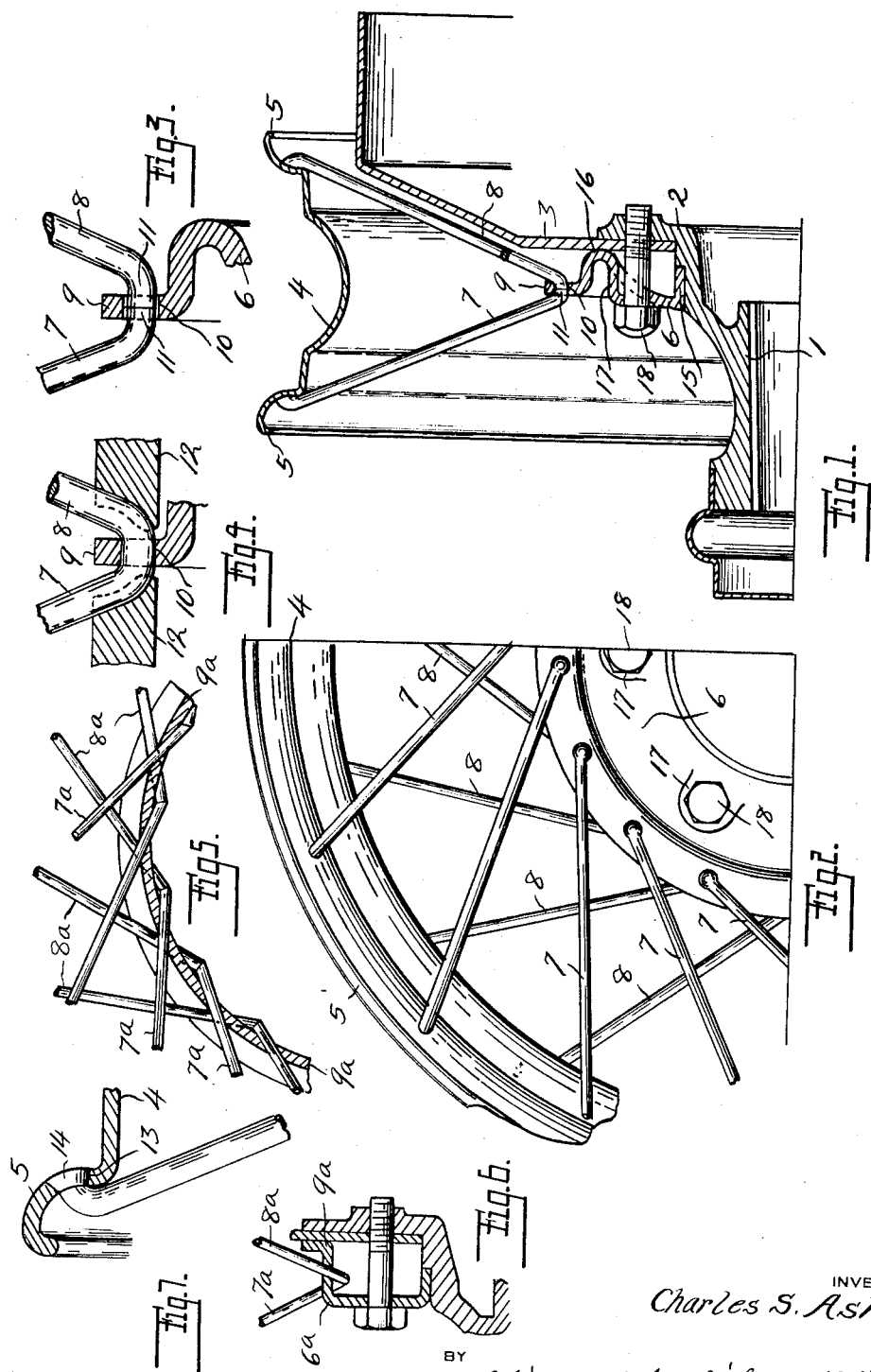
INVENTOR
Charles S. Ash
ATTORNEYS

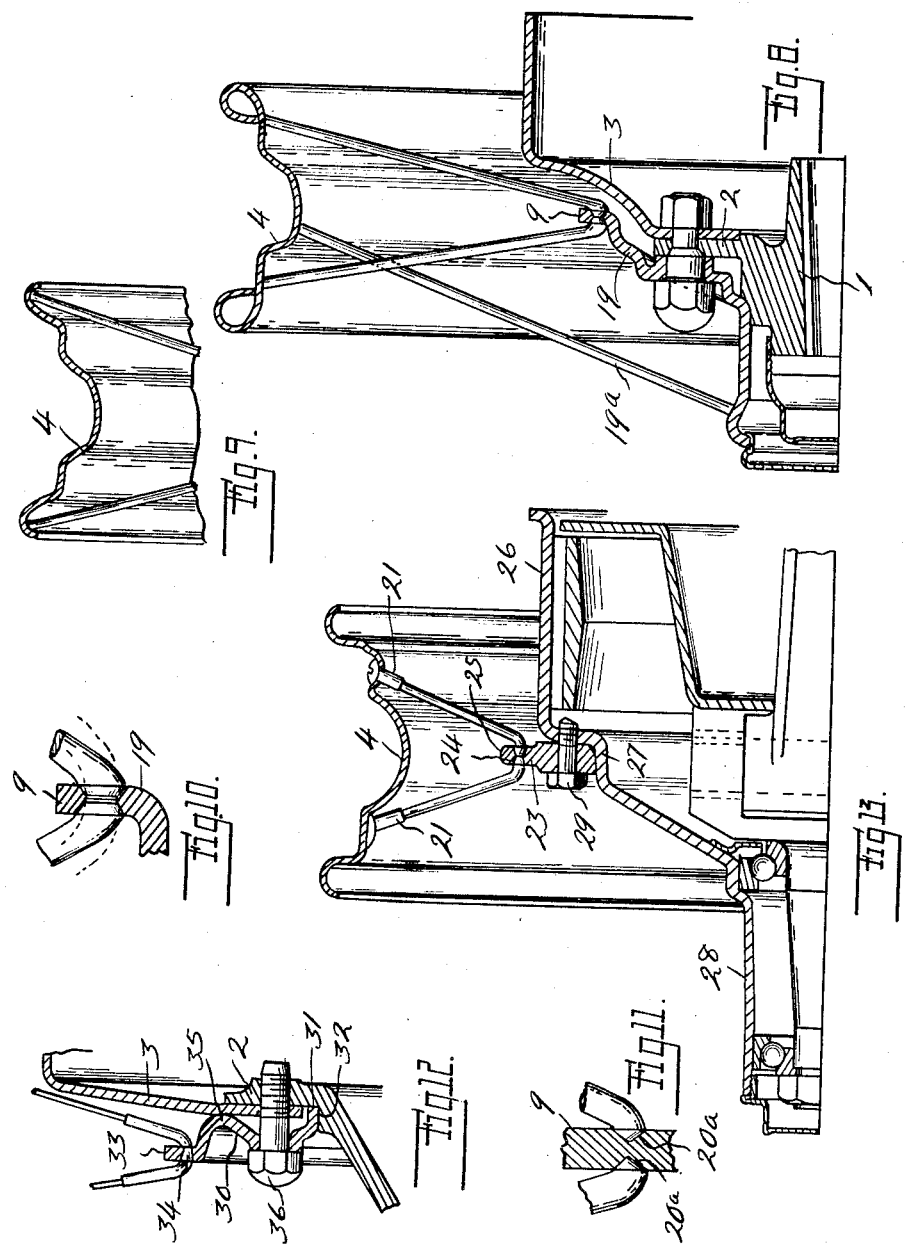

Patented Nov. 7, 1933

1,933,956

UNITED STATES PATENT OFFICE 1,933,956

METHOD OF MANUFACTURING SPOKED WHEELS

Charles S. Ash, Birmingham, Mich., assignor to Kelsey-Hayes Wheel Corporation, Detroit, Mich., a corporation of New York Original application July 9, 1927, Serial No. 204,544. Divided and this application November 3, 1930. Serial No. 493,142. Renewed November 11, 1931

11 Claims. (Cl. 29—159.02)

This invention relates to the method of making vehicle wheels of the wire spoke suspension type and an object of the invention is to facilitate manufacture and secure even spoke tension by the welding of the spokes in place and to produce a wheel the construction of which is such as to particularly adapt the same to assembly by a welding process, thus producing a wheel which is cheap to manufacture and is very strong and rigid, yet simple in construction. Another object is to provide a wire wheel which is light in weight and may be readily applied to any of the several forms of hub constructions commonly employed, and may be quickly and easily demounted therefrom. It is also an object to provide a spoke arrangement whereby the spokes may be welded to the wheel hub or mounting member in a manner to obviate welding defects and to facilitate the welding operation and, further, to facilitate the welding, if desired, of the outer ends of the spokes to the wheel rim. It is also an object of the invention to facilitate the assembly and the mounting of the wheel by providing an annular wheel hub or mounting member to which the inner ends of the spokes of one row are attached in opposed relation to the inner ends of the spokes of another row by welding each pair of opposed spoke ends together and to said member by a single weld, said rows of spokes having a common plane of attachment to said member and diverging outwardly therefrom. Further objects are to provide certain other new and useful features in the method of construction and in the arrangement of parts, all as hereinafter more fully described.

With the above and other ends in view, the invention consists in the matters hereinafter set forth and more particularly pointed out in the appended claims, reference being had to the accompanying drawings in which Figure 1 is a longitudinal vertical section through the upper half of a hub and wheel mounted thereon, said wheel being illustrative of an embodiment of the present invention;

Figure 2 is a side elevation of a portion of Figure 1;

Figures 3 and 4 are sectional details illustrating the method of assembling and securing the spokes in place;

Figures 5 and 6 are longitudinal and transverse sectional details showing a modified construction and method of assembly;

Figure 7 is a sectional detail illustrative of the manner in which the outer ends of the spokes may be connected to a wheel rim;

Figure 8 is a view similar to that of Figure 1 showing a modified construction;

Figure 9 is a sectional detail showing a modification in the attachment of the outer ends of the spokes to the rim;

Figures 10 and 11 are sectional details similar to that of Figure 4 and illustrating modifications in the manner of welding the inner ends of spokes to an annular wheel mounting member;

Figure 12 is a sectional detail showing a modified form of annular wheel mounting member and spoke connection thereto;

Figure 13 is a sectional view similar to that of Figures 1 and 8 and showing a further modification.

As shown in Figure 1, a hub 1 of any suitable form and construction is provided with a radial flange 2 to which the usual brake drum 3 is secured. The wheel proper comprises a rim 4 of any suitable cross sectional configuration having side flanges 5, an annular hub or mounting member 6, and two series 7 and 8 of wire spokes or the like connecting said rim and member, which member is formed, preferably, with an outwardly extending radial flange or peripheral portion 9 formed with a series of holes 10 to receive the laterally bent inner ends 11 of said spokes, as shown in Figure 3. A spoke 7 of the outer row of spokes is arranged with its inner end in opposed or abutting relation to the inner end of a spoke 8 of the inner row, within one of the openings 10 and these abutting ends are connected and firmly secured within said opening by a welding operation, electrodes indicated at 12 in Figure 4 being placed against the outer sides of the bends of the spokes to heat said ends and by pressure forcing said ends into close contact within the opening in the flange 9, the heat and pressure applied causing said abutting ends to weld together and at the same time expand within the opening filling the same and effecting a welded connection between said end portions and said flange within the opening. A very strong weld and connection is thus secured between the inner ends of each pair of spokes and said flange of the mounting member 6 and a butt weld is secured between the abutting ends of the spokes. As these laterally bent spoke ends are inserted within the flange openings and the electrodes are applied at said ends, defective welding is obviated and the two spokes of each pair form, in effect, a continuous spoke extending through an opening in the flange 9 and further strength and rigidity is secured through the simultaneous filling up of the hole by the expansion of the spoke ends and the welding of these ends to the flange within said hole.

In the assembling of the wheel, the annular hub member 6 and rim 4 are held exactly concentric with the rim preferably compressed radially, so that when rim and hub member are connected by the spokes, the wheel will be perfectly round and true. While so held, the inner ends of the spokes may be welded to the hub member, as described, and the outer ends of the spokes will be secured to the rim, either by providing heads on the spokes, as shown in Figure 7, or by welding or otherwise, so that when the spokes have cooled and the wheel is released the expansion of the rim which has been held under compression and the movement of the inner ends of the spokes toward each other caused by the force applied thereto by the electrodes in welding will place said spokes under even tension and give a substantially perfect suspension wheel. In this method of assembly a butt welding operation is thus employed, which operation at the same time effects a tensioning of the spokes.

Another arrangement of spokes employing substantially the same butt welding operation and method of attaching the spokes to the mounting member is shown in Figures 5 and 6. In this arrangement straight spokes are employed, the inner ends of the spokes being inserted through suitable openings in a horizontal portion 9a of the mounting or ring member 6a, each spoke being inserted through a separate hole formed to permit the straight spoke to extend tangentially of the member and with the inner end of a spoke 7a in one row abutting the inner end of a spoke 8a in the other row and with the spokes of each pair diverging outwardly and laterally of the wheel. By applying movable electrodes to the free abutting ends of the spokes, substantially as hereinbefore described, these ends are butt welded and attached to the mounting member.

If found desirable the side flanges 5 of the rim may be formed with a series of tapered holes 13 to receive the laterally bent outer end portions of the spokes, which ends may be provided with heads, as shown in Figure 7, to seat within seats provided by the openings after said spokes have been threaded through said openings, or these heads may be formed upon the laterally bent ends of the spokes by the application thereto of suitably shaped electrodes 12 which are forced toward each other as the spoke ends are electrically heated and thus form the heads 14 within the openings, said heads and bent end portions being welded to the rim simultaneously with the forming of the heads, if so desired, to securely and rigidly attach the outer ends of the spokes to the rim flanges.

The annular hub or mounting member 6 may be formed of sheet metal, as shown in Figure 1, and shaped to seat across the angle between the body of the hub 1 and its flange 2, said ring member having an inturned inner edge portion 15 to guide the ring to place in mounting the wheel and to seat upon a cylindrical portion of the hub, said ring being also formed with a reverse bend just inwardly from its peripheral flange 9 to form a shoulder 16 adapted to seat against the outer surface of the drum wall 3 which is secured against the outer side of the flange 2 of the hub. Between the seating portion 15 and shoulder 16 the ring is formed with a series of seats 17 provided with openings for bolts 18, the heads of which seat upon said seats and the screw threaded ends of which are screwed into screw threaded openings in the flange 2 to firmly, rigidly and detachably hold the ring to its seats on the hub and the wheel demountably in position.

In this construction the wire spokes are all secured to a single hub ring or annular mounting member 6 in a common plane, that is, to a single outwardly extending flange and diverge outwardly from said flange and extend tangentially to their places of attachment to the rim, thus providing a demountable wheel structure which is narrow in the direction of the hub axis and which, by the divergency of the spokes, provides strong lateral bracing at the rim with a minimum of space required adjacent the hub. In other words, the entire demountable structure lies between the planes of the side flanges of the rim and this lateral bracing is further increased by attaching the outer ends of the spokes to the side flanges 5 of the rim outside of the channel portion of the rim. Further, the offsetting of the rim in either direction relative to the mounting member may be readily secured by offsetting the flange 9 inwardly toward or over the drum, as shown in Figure 8, or outwardly, as shown in Figure 1.

As shown in Figure 3, the wheel rim 4 is offset inwardly of the hub 1 by the form of the ring or annular hub member 19, the outer portion of which member is formed or curved laterally to bring its outstanding flange to which the spokes are attached nearer the inner end of the hub, the drum wall 3 being curved laterally to provide for mounting said ring upon the cylindrical portion of the hub adjacent its flange 2 to which said drum wall is secured. If found desirable, the member 19 may be extended outwardly of the hub in the form of a shell and a third row of spokes 19a may be provided to brace the wheel laterally, said spokes being welded or otherwise secured at their inner ends to the shell adjacent the outer end of the hub and at their outer ends to the rim, preferably adjacent the center line of the rim. The peripheral flange or edge portion 9 of the ring or shell 19 is formed with a series of openings each of which is tapered inwardly from its ends, as more clearly shown in Figure 10, so that when said spoke ends are inserted therein with their end surfaces in abutting relation and then heated by an electric current in the manner described, said end portions will be expanded filling the seats and be welded therein, the pressure applied by the electrodes expanding said end portions and at the same time moving said spoke ends toward each other and toward the sides of the flange, thus shortening the spokes to further increase their tension when the assembled wheel is released from its clamping means after assembly. In the construction illustrated in Figure 11, instead of holes being formed in the flange, said flange may be provided with depressions and the ends of the spokes may be pointed, as at 20a, to engage these depressions and be welded therein in the manner described.

In this construction shown in Figure 8, the outer ends of the spokes are shown as welded to the rim inwardly of its side flanges, but they may be welded to the extreme outer portion of these flanges within the channels formed thereby, as shown in Figure 9, or, as shown in Figure 13, the spokes may be provided with screw threaded and headed nipples 21 seated within depressions in the bottom wall of the rim, as is the usual practice in building wire wheels, so that by turning these nipples the spokes can be put under tension, thus connecting the outer ends of the spokes to the rim without welding them thereto.

The individual spokes of both rows may be separately connected to an inner or hub mounting ring member 23, as shown in Figure 13, by forming tapered holes 24 in the radial flange 25 of this member, inserting the laterally bent end of each spoke in one of these holes and then applying the electrodes as before to heat said end and by pressure expand said end within the opening and weld the same to the flange within said opening. As shown, the ring member 23 may have a thickened body portion inwardly of its peripheral flange to fit within an annular seat therefor formed by curving the wall of the brake drum 26, as at 27, which wall in this construction is continued outwardly and formed to serve as a hub casing 28. Openings are provided in the ring 23 to receive bolts 29 for detachably securing the ring to its seat and holding the wheel mounted on the hub.

A further modified construction is shown in Figure 12 wherein the inner or hub ring member 30 of the wheel is formed with an inner edge flange 31 to seat upon a shoulder 32 formed on a wall of the hub proper adjacent the radial flange 2 thereof to which the brake drum wall 3 is secured and this ring 30 has a radial peripheral flange 33 formed with openings through which the spokes are threaded, said spokes being provided with heads 34 to seat in said openings, said flange being spaced from the drum wall by an annular bend in the ring wall forming a shoulder 35 to engage said drum wall. Between said annular shoulder 35 and inner flange 31 the wall of the ring is curved transversely in cross section and formed with openings to receive bolts 36 for securing the ring against its seats and securely and detachably holding the wheel in place, the spring of the curved portion of the ring wall through which the bolts pass putting a tension on these bolts to hold them against working loose.

In this construction where all spokes converge inwardly to substantially a single plane of attachment to the mounting member with this plane of attachment located substantially in the plane of the center line of the rim, all spokes are of the same length insuring even strain and when the wheel is secured in place on the hub this tension of the spokes is not disturbed and the wheel has its maximum of strength. Further, this construction is such as to be readily adaptable to various hub constructions by a simple change in the form of the mounting member to move the tread plane of the wheel inwardly to any desired extent, as in the plane of the drum or steering knuckle and the cost of manufacture is greatly reduced by the substitution of the ring mounting for a complete hub shell, which shell is necessary where spokes diverge toward the hub. Spokes of large cross sectional area are preferable in the present construction and a lesser number of spokes is necessary, thus further reducing the cost and accidental injury to the spokes is reduced to a minimum as they do not project outwardly of the wheel toward the hub, but all lie within the plane of the rim.

Other modifications in the construction to suit the form of the hub upon which the wheel is to be mounted may be made within the scope of the appended claims without departing from the spirit of the invention and such changes are contemplated.

The present application is a division of my copending application Serial Number 204,544, filed July 9th, 1927.

What I claim as my invention is:

1. The method of manufacturing spoked wheels which method includes locating and holding a rim member and a hub member in a predetermined relation and position, placing pairs of spokes in position for connecting the hub and rim members with the spokes of each pair in opposed and outwardly divergent relation and then welding said spokes in place with pressure applied to said spokes laterally thereof during the welding operation to add tension to said spokes.

2. The method of manufacturing spoked wheels which consists in locating and holding a rim member and a hub member in predetermined relation, placing rows of spokes in position for connecting said members with the inner end portions of the spokes in one row in opposed relation to the inner end portions of spokes in the other row and then welding the opposed spoke portions and simultaneously putting said spokes under tension.

3. The method of manufacturing spoked wheels which consists in locating and holding a rim member and a hub member in a fixed position, placing rows of spokes in position to connect said members with said spokes arranged in pairs and with the spokes of each pair in outwardly divergent relation laterally of the wheel with their inner ends in connection with said hub member and in opposed relation, and then applying pressure to the spokes to put the same under tension and simultaneously welding said opposed ends.

4. The method of manufacturing spoked wheels which consists in locating and holding a rim member in a predetermined relation to a hub member formed for the connection thereto of the inner ends of spokes, placing rows of spokes in connection with the rim at their outer ends and with their inner ends in engagement with said hub member, and then simultaneously welding a spoke in one row to a spoke in the other row.

5. The method of manufacturing spoked wheels which consists in locating and holding a rim member in a predetermined relation to a hub member formed for the connection thereto of the inner ends of spokes, placing rows of spokes in connection with the rim at their outer ends and with the inner ends of the spokes in one row in opposed relation to the inner ends of the spokes in the other row and in connection with said hub member, and then butt welding the inner opposed ends of the spokes.

6. The method of manufacturing spoked wheels which consists in locating and holding a rim member in a predetermined relation to the hub member formed to receive laterally bent ends of spokes, placing rows of spokes in position with their outer ends in connection with the rim member and with their laterally bent inner ends in abutting relation and in connection with the hub member, and then simultaneously butt welding spokes in one row to spokes in the other row.

7. The method of manufacturing spoked wheels which consists in locating and holding a rim and a hub member in concentric relation, placing two rows of spokes in connection at their outer ends with the rim member with said rows at opposite sides of the central plane of the rim and with their inner ends in connection with the hub member in substantially a common plane, and then forcing the inner end portions of the spokes of one row toward those of the other row and toward the hub member and welding said end portions while the spokes are so held under tension.

8. The method of manufacturing spoked wheels which consists in locating and holding a rim and a hub member in concentric relation, placing two rows of spokes in connection at their outer ends with said rim at opposite sides of the longitudinal center line of the rim and with their inner ends engaged in openings in the hub member and with the ends of the spokes in one row in opposed relation to the ends of the spokes in the other row, and then butt welding the opposed ends of the spokes within said openings in said hub member.

9. The method of manufacturing spoked wheels which consists in locating and holding rim and hub members in concentric relation, placing two rows of spokes in connection at their outer ends to said rim at opposite sides of the longitudinal center line of the rim and with their inner ends engaged in seats in the hub member, the inner ends of the spokes of one row being opposed to the inner ends of the spokes of the other row and then heating and pressing said inner ends of the spokes into their seats to expand said inner ends therein and put said spokes under tension and weld the same to the hub member.

10. The method of making spoked wheels, which comprises assembling a hub member provided with spoke holes within a rim member also provided with spoke holes, assembling two rows of spokes with the hub and rim members by engaging the spokes of both rows in the spoke holes, anchoring the spokes of both rows in one of the members with their free ends extending within the holes of the other of the members and with the free ends of one row extending toward the free ends of the other row and anchoring the spokes of both rows to the other of the members and at the same time directly tensioning these spokes by simultaneously anchoring the free ends of adjacent spokes of both rows to the other of the members and applying pressure to these spokes at their free ends simultaneously with the anchoring.

11. The method of manufacturing spoked wheels, which consists in assembling a hub member within a rim member, anchoring pairs of spokes to one of the members with the spokes of each pair having their ends for connection to the other of the members in opposed relation, and then simultaneously welding the last mentioned ends of the spokes to the last mentioned member with pressure applied to the spokes laterally thereof during the welding operation to add tension to the spokes.

CHARLES S. ASH.

CERTIFICATE OF CORRECTION.

Patent No. 1,933,956.  November 7, 1933.

CHARLES S. ASH.

It is hereby certified that error appears in the printed specification of the above numbered patent requiring correction as follows: In the heading to the printed specification, date of filing application, line 7, for "July 9, 1922" read July 9, 1927; and that the said Letters Patent should be read with this correction therein that the same may conform to the record of the case in the Patent Office.

Signed and sealed this 9th day of January, A. D. 1934.

F. M. Hopkins (Seal) Acting Commissioner of Patents.